(12) United States Patent
Takahashi et al.

(10) Patent No.: US 7,601,454 B2
(45) Date of Patent: Oct. 13, 2009

(54) POLYMER ELECTROLYTE FUEL CELL

(75) Inventors: Ryoichiro Takahashi, Wako (JP);
Chikara Iwasawa, Wako (JP);
Masahiro Ise, Wako (JP); Yoichi Asano, Wako (JP); Hideki Watanabe, Sayama (JP); Atsuhito Yoshizawa, Sayama (JP); Takashi Suzuki, Sayama (JP); Osamu Kakutani, Sayama (JP)

(73) Assignee: Honda Motor Co. Ltd., Tokyo (JP)

( * ) Notice: Subject to any disclaimer, the term of this patent is extended or adjusted under 35 U.S.C. 154(b) by 818 days.

(21) Appl. No.: 11/074,931

(22) Filed: Mar. 9, 2005

(65) Prior Publication Data
US 2005/0202308 A1  Sep. 15, 2005

(30) Foreign Application Priority Data
Mar. 11, 2004  (JP) ............... 2004-069533

(51) Int. Cl.
*H01M 4/96* (2006.01)
(52) U.S. Cl. ................................. 429/42; 429/44
(58) Field of Classification Search ............ 429/42, 429/44
See application file for complete search history.

(56) References Cited

U.S. PATENT DOCUMENTS

| | | | |
|---|---|---|---|
| 4,804,592 A | | 2/1989 | Vanderborgh et al. |
| 4,847,173 A | * | 7/1989 | Mitsunaga et al. ......... 429/42 X |
| 5,500,292 A | | 3/1996 | Muranaka et al. |
| 5,607,785 A | * | 3/1997 | Tozawa et al. ............ 429/42 X |
| 6,720,106 B2 | * | 4/2004 | Fukuda et al. ................ 429/42 |
| 6,916,575 B2 | * | 7/2005 | Hori et al. .................. 429/42 |
| 7,232,627 B2 | * | 6/2007 | Fukuda et al. ............ 429/42 X |
| 2003/0072991 A1 | | 4/2003 | Matsubara et al. |
| 2003/0091891 A1 | | 5/2003 | Yoshida et al. |

FOREIGN PATENT DOCUMENTS

| | | |
|---|---|---|
| EP | 0 560 295 B1 | 6/1996 |
| JP | 1-143151 A | 6/1989 |
| JP | 09-180730 | 7/1997 |
| JP | 2001-319663 | 11/2001 |
| JP | 2002-151090 | 5/2002 |
| JP | 2002-164057 | 6/2002 |
| JP | 2003-151564 A | 5/2003 |
| JP | 2005-135787 A | 5/2005 |
| WO | WO 02/056404 A1 | 7/2002 |

* cited by examiner

*Primary Examiner*—Stephen J. Kalafut
(74) *Attorney, Agent, or Firm*—Arent Fox LLP

(57) ABSTRACT

In a polymer electrolyte fuel cell in which a cathode diffusion layer, a cathode electrode catalyst layer, a polymer electrolyte membrane, an anode electrode catalyst layer, and an anode diffusion layer are laminated in this order, electron conductivity of the cathode electrode catalyst layer at a portion on the side of the cathode diffusion layer is higher than at a portion on the side of the polymer electrolyte membrane and electron conductivity of the cathode electrode catalyst layer at the portion on the side of the polymer electrolyte membrane is lower than at the portion on the side of the cathode diffusion layer, and furthermore, electron conductivity of the anode electrode catalyst layer at a portion on the side of the anode diffusion layer is higher than at a portion on the side of the polymer electrolyte membrane and electron conductivity of the anode electrode catalyst layer at the portion on the side of the polymer electrolyte membrane is lower than at the portion on the side of the anode diffusion layer.

6 Claims, 3 Drawing Sheets

POLYMER ELECTROLYTE FUEL CELL

BACKGROUND OF THE INVENTION

1. Technical Field

The present invention relates to polymer electrolyte fuel cells, and in particular, relates to a technique which improves power generation efficiency of polymer electrolyte fuel cells.

2. Background Art

Recently, exhaustion of petroleum resources is a crucial issue, and environmental problems such as air pollution and global warming caused by consumption of fossil fuels have become serious. Under these circumstances, fuel cells have attracted much attention as a clean power source for electric motors in which carbon dioxide is not generated, and such fuel cells are being widely developed and used.

In the case in which such a fuel cell is used in a vehicle, a polymer electrolyte fuel cell in which a polymer electrolyte membrane is used is desirably used since high voltage and large current can be obtained. A membrane electrode assembly (hereinafter simply referred to as an MEA) for the polymer electrolyte fuel cell is produced as follows: a catalyst such as platinum is carried by a catalyst carrier such as carbon black; a pair of electrode catalytic layers is made by unifying the catalyst and an ion conducting polymer binder; a polymer electrolyte membrane having ion conductivity is disposed between the electrode catalytic layers; and a gas-diffusion layer is formed on each of the electrode catalytic layers. Furthermore, a separator which also functions as a gas passage is formed on each of the gas-diffusion layers to obtain a polymer electrolyte fuel cell.

In such a polymer electrolyte fuel cell, a reducing gas, such as hydrogen or methanol, is introduced at one electrode catalytic layer (fuel electrode) through the gas-diffusion layer of the fuel electrode side, and an oxidizing gas such as air or oxygen is introduced at the other electrode catalytic layer (oxygen electrode) through the gas-diffusion layer of the oxygen electrode side. In the fuel electrode, due to the existence of the catalyst in the electrode catalytic layer, protons ($H^+$) and electrons are generated from the reducing gas, and protons migrate to the electrode catalytic layer of the oxygen electrode side through the polymer electrolyte membrane. In the oxygen electrode, due to the existence of the catalyst in the oxygen electrode, protons react with the oxidizing gas introduced at the oxygen electrode and electrons to produce water. Therefore, by electrically connecting the fuel electrode and the oxygen electrode with a lead, a circuit in which electrons generated in the fuel electrode migrate to the oxygen electrode is formed, and an electric current is obtained.

To produce such an MEA, various methods such as a method in which an electrode layer formed on a supporting body is hot pressed to an electrolyte membrane, a method in which an electrode layer is cast on an electrolyte membrane, or a method in which an electrode layer is directly coated on an electrolyte membrane by spraying or the like, have been suggested. Except for the case in which the composition varies in a thickness direction unintentionally, the electrode generally has a single layer structure of a single composition.

To improve the efficiency of such an electrode, various techniques have been suggested conventionally. For example, from the viewpoint that gas concentration is relatively high in an electrode layer of a diffusion layer side and concentration of ionized ion and electron is relatively high in an electrode layer of an electrolyte membrane side, a technique in which composition of the electrode layer in the thickness direction is changed, that is, the amount of supported catalyst at the electrolyte membrane side is increased to increase reaction sites, is disclosed in Japanese Unexamined Patent Application Publication No. Hei 09-180730. Furthermore, a technique in which the amount of electrolyte in the thickness direction is changed to control the diffusion properties of the reaction gas (see Japanese Unexamined Patent Application Publication No. 2001-319663), a technique in which hydrophilicity and hydrophobicity are changed in the thickness direction of the electrode layer to control diffusion of water generated in the reaction (see Japanese Unexamined Patent Application Publication No. 2002-151090), and a technique to control diffusion of both reaction gas and water (see Japanese Unexamined Patent Application Publication No. 2002-164057) are disclosed.

However, the above-mentioned conventional techniques are intended to control reaction or distribution of reactant and product, and there has been no technique in which composition is varied to focus on flow of electrons and protons.

SUMMARY OF THE INVENTION

The present invention was completed in view of the facts that high electron conductivity is required in the electrode layer of the diffusion layer side to obtain electric current, and that high proton conductivity is required in the electrode layer of the electrolyte membrane side to promote proton migration around the catalyst. That is, an object of the invention is to provide a polymer electrolyte fuel cell having an electrode layer in which gradients are given to electron conductivity and proton conductivity, to improve power generation efficiency.

The polymer electrolyte fuel cell of the present invention has a cathode diffusion layer, a cathode electrode catalyst layer, a polymer electrolyte membrane, an anode electrode catalyst layer, and an anode diffusion layer, which are stacked in this order, and furthermore, an electron conductivity of the cathode electrode catalyst layer is controlled so that the layer portion on the side of the cathode diffusion layer is higher than the layer portion on the side of the polymer electrolyte membrane and the layer portion on the side of the polymer electrolyte membrane is lower than the layer portion on the side of the cathode diffusion layer, and an electron conductivity of the anode electrode catalyst layer is controlled so that the layer portion on the side of the anode diffusion layer is higher than the layer portion on the side of the polymer electrolyte membrane and the layer portion on the side of the polymer electrolyte membrane is lower than the layer portion on the side of the anode diffusion layer.

In the present invention, since the electron conductivity of the electrode catalyst layer near the diffusion layer side is higher than that of a conventional electrode catalyst layer having a uniform single layer, electrons can smoothly flow to an outer electric circuit after protons and electrons are generated by a reaction of fuel gas diffused from the diffusion layer. Furthermore, a reaction of electrons supplied from the outer electric circuit and oxidizing gas is also smoothly promoted. As a result, an internal resistance of the fuel cell is reduced, improving power generation efficiency.

EMBODIMENTS OF THE INVENTION

The present invention is further explained as follows.

Figure 1:
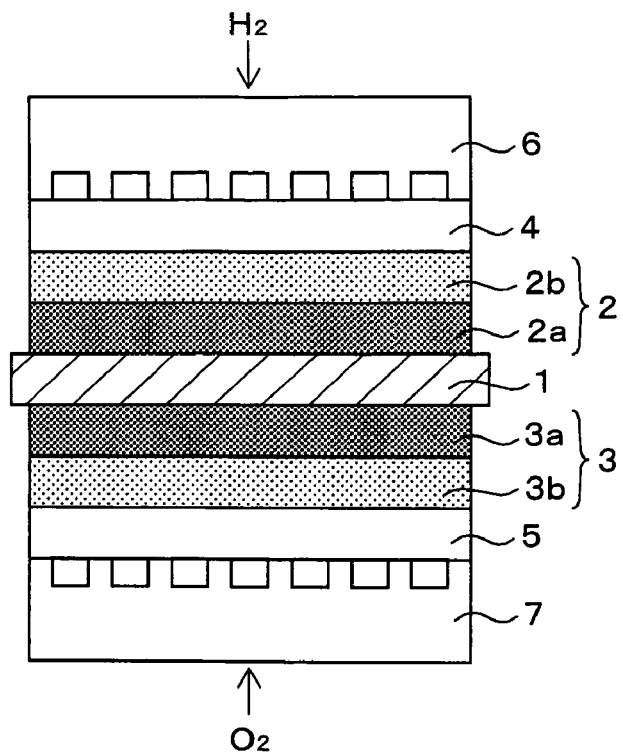
FIG. 1 is a conceptual diagram showing an embodiment of a membrane electrode assembly.

FIG. 1 shows a conceptual diagram of the MEA, which is an embodiment of the present invention. In FIG. 1, reference numeral 1 is a polymer electrolyte membrane. On each side of the polymer electrolyte membrane 1, an anode electrode catalyst layer 2 and a cathode electrode catalyst layer 3 are layered. On the anode electrode catalyst layer 2, an anode diffusion layer 4 and an anode separator 6 are stacked in this order, and on the cathode electrode catalyst layer 3, a cathode diffusion layer 5 and a cathode separator 7 are stacked in this order.

Furthermore, the anode electrode catalyst layer 2 has two layer portions 2a and 2b, and the cathode electrode catalyst layer 3 has two layer portions 3a and 3b. The portions 2a and 3a, which are near the polymer electrolyte membrane 1, have higher proton conductivity compared to the portions 2b and 3b. The portions 2b and 3b, which are near the diffusion layers 4 and 5, have higher electron conductivity compared to the portions 2a and 3a.

A fuel gas such as hydrogen is supplied from the anode separator 6, diffused in the anode diffusion layer 4, and ionized to protons and electrons in the anode electrode catalyst layer 2. The electrons flow out to an outer electric circuit, and the protons penetrate the polymer electrolyte membrane 1 to diffuse to the cathode side. After the protons reach the cathode electrode catalyst layer 3, the protons react with an oxidizing gas such as oxygen and the electrons supplied from outside, to generate water.

In the anode electrode catalyst layer of the present invention, since electron conductivity of the portion near the diffusion layer is higher than that at the portion near the polymer electrolyte membrane, electrons generated from hydrogen immediately flow out to the outer electric circuit, in contrast to the conventional electrode catalyst layer which is formed uniformly. Furthermore, also in the cathode electrode catalyst layer, since electron conductivity of the portion near the diffusion layer is higher than the portion near the polymer electrolyte membrane, electrons coming from the outer electric circuit, protons diffused from the anode, and oxidizing gas supplied from the separator can be immediately reacted. Furthermore, proton conductivity of the portions near the polymer electrolyte membrane is higher, and protons can be smoothly diffused from the anode side to the cathode side.

Figure 2:
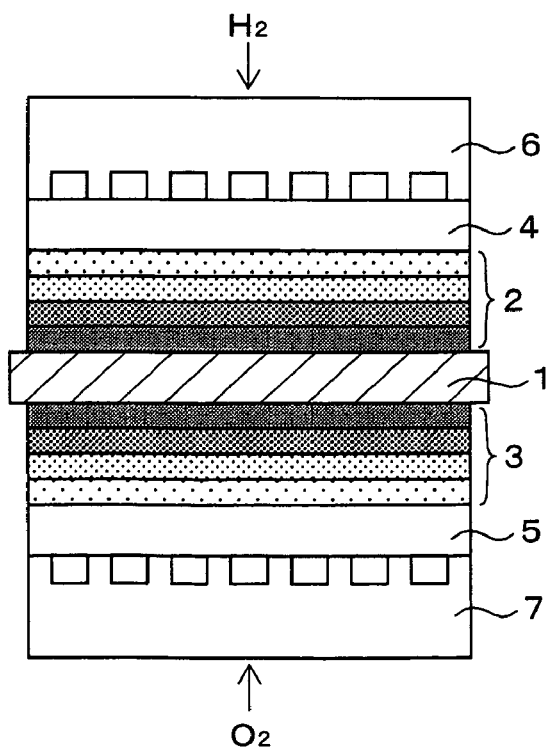
FIG. 2 is a conceptual diagram showing another embodiment of a membrane electrode assembly.

One embodiment of the present invention in which the electrode catalyst layer consists of two layer portions is explained as above; however, the present invention is not limited only to this embodiment. For example, an MEA having an electrode catalyst layer which consists of three or more layer portions and in which the portion nearest to the diffusion layer has the highest electron conductivity and the lowest proton conductivity, the portion nearest to the electrolyte membrane has the lowest electron conductivity and the highest proton conductivity, and the portions between the both portions have electron conductivity and proton conductivity varied stepwise can be mentioned. FIG. 2 shows a conceptual diagram of such an embodiment of an MEA having an electrode catalyst layer which consists of four layer portions.

Figure 3:
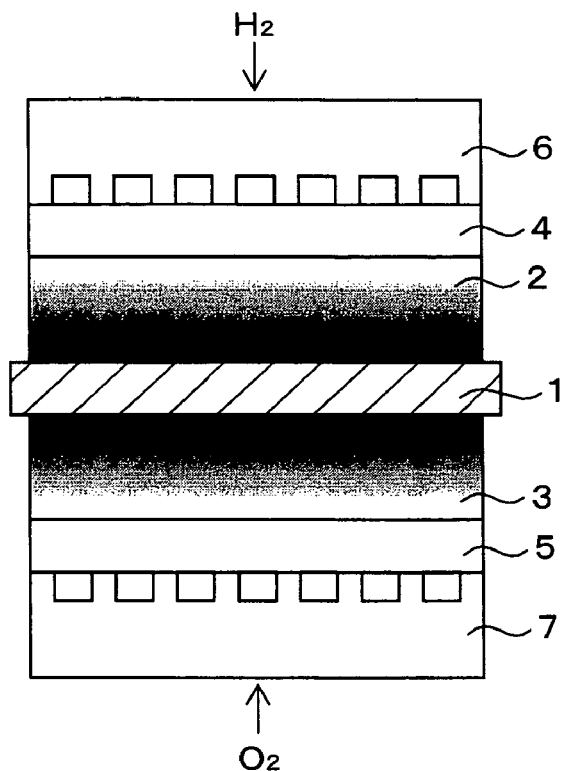
FIG. 3 is a conceptual diagram showing another embodiment of a membrane electrode assembly.

Furthermore, in another embodiment of the present invention, an MEA has an electrode catalyst layer which consists of a single layer and in which electron conductivity and proton conductivity are varied gradually. FIG. 3 shows a conceptual diagram of such an embodiment of this MEA.

As a method to produce the electrode catalyst layer having plural layer portions, a method in which plural layers, each having varied electron conductivity and proton conductivity by changing the addition ratio of raw material are beforehand prepared on supporting bodies and these layer portions are sequentially layered by a heat press on the electrolyte membrane, a method in which layer portions are sequentially cast on the electrolyte membrane, a method in which layer portions are directly coated, or any other methods to form the electrode catalyst layer can be mentioned.

It is desirable that the cathode and anode electrode catalyst layers of the present invention contain carbon whiskers, and particularly desirable that the carbon whiskers have a fiber diameter in a range from 50 to 300 nm. If such carbon whiskers are used, many fine pores having appropriate size are formed in the electrode catalyst layer, which function as flow passages facilitating migration of water and fuel, and as a result, efficiency of the fuel cell is improved. Furthermore, since the carbon whiskers function as new additional conductive paths, internal resistance can be reduced. As the carbon whisker, for example, vapor grown carbon fiber (VGCF) or the like can be mentioned.

As a separator used in the present invention, a carbon separator, metallic separator, or other optional separators can be used. As a metallic separator, from the viewpoints of properties required of a separator for polymer electrolyte fuel cells such as corrosion resistance or contact electric resistance, aluminum-based alloy, iron-based alloy, nickel-based alloy, titanium-based alloy or the like are particularly desirable since they themselves have great corrosion resistance and low contact electric resistance.

Furthermore, a separator at the surface of the metallic base material is degreased and washed, and thin layer of noble metal is formed by plating, vapor deposition, sputtering, or CVD, can also be used. As a noble metal, from the viewpoint of improving the properties such as corrosion resistance and contact electric resistance, gold, silver, platinum, palladium, or an alloy of these metals is particularly desirable.

Figure 6:
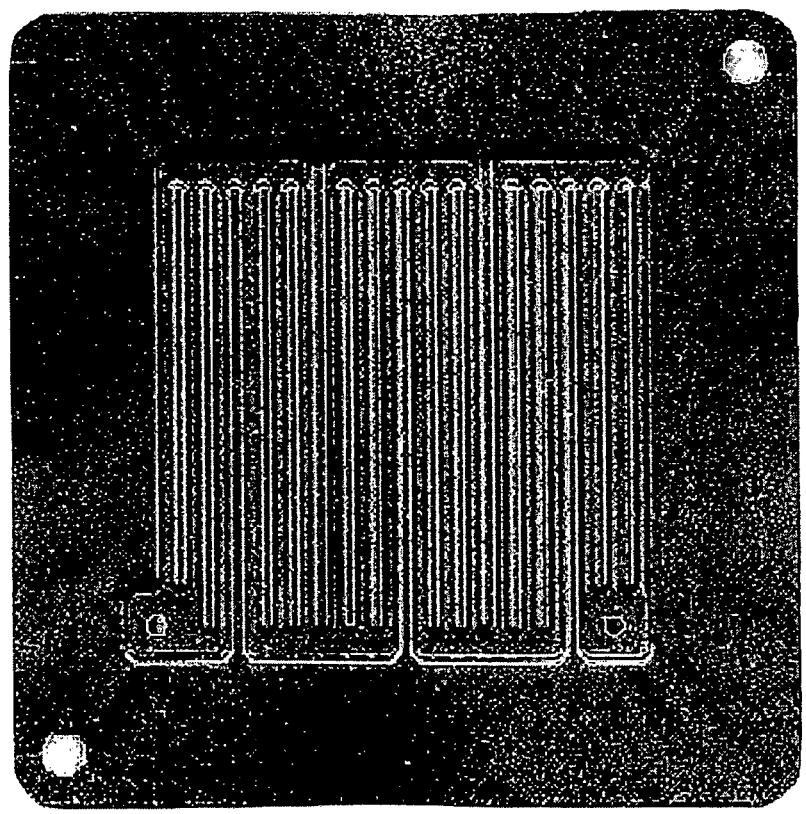
FIG. 6 is an embodiment of a separator used in the polymer electrolyte fuel cell of the present invention.

On the metallic separator mentioned above, press forming is performed to form flow passages of a fuel gas or oxidizing gas, to obtain a metallic separator for polymer electrolyte fuel cells. FIG. 6 shows an embodiment of such a separator.

EXAMPLES

Example 1

As an electrode paste for the anode electrode catalyst layer 2a of the MEA shown in FIG. 1, a mixture of 100 parts by weight of carbon black (except for platinum) and 140 parts by weight of Nafion which is a perfluorosulfonic acid based proton conductive material was used. As an electrode paste for the anode electrode catalyst layer 2b, a mixture of 100 parts by weight of carbon black (except for platinum) and 15 parts by weight of vapor grown carbon fiber (VGCF) in a solid weight ratio was used. These electrode pastes were sequentially sprayed on the surface of electrolyte membrane 1 to form the anode electrode catalyst layer consisting of two layer parts, and the MEA of Example 1 was thereby prepared.

Comparative Example 1

Using an electrode paste containing 100 parts by weight of carbon black, 140 parts by weight of Nafion, and 15 parts by weight of VGCF in solid weight ratio, the anode electrode catalyst layer consisting of a single layer, and the MEA of Comparative Example 1 was thereby prepared.

Figure 4:
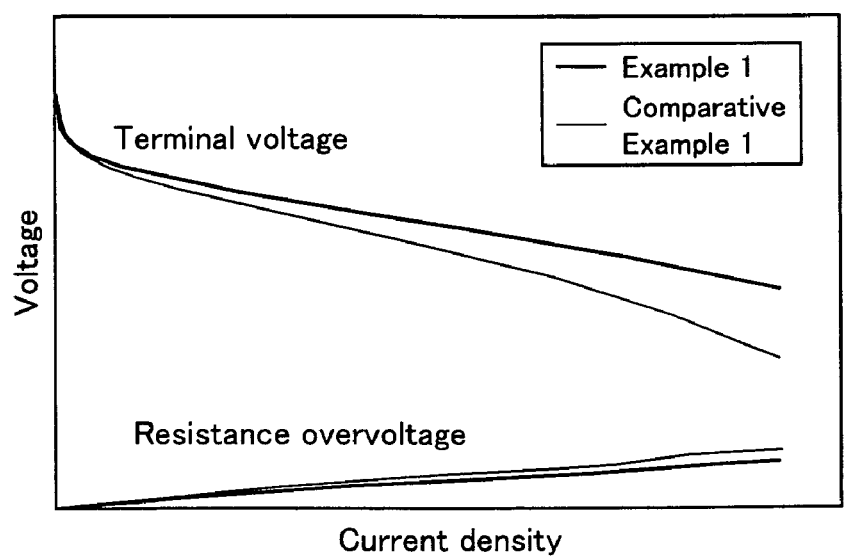
FIG. 4 is a graph showing power generation efficiency of the electrode assembly of Examples and Comparative Examples.

The efficiency of MEAs of Example 1 and Comparative Example 1 were compared. The results are shown in FIG. 4. FIG. 4 clearly shows that deterioration of terminal voltage is restrained and resistance overvoltage is reduced even under operation at high current density in the MEA of Example 1.

Example 2

As an electrode paste for the anode electrode catalyst layer 2a of the MEA shown in FIG. 1, a mixture of 100 parts by weight of carbon black (except for platinum) and 140 parts by weight of Nafion was used. As an electrode paste for the anode electrode catalyst layer 2b, a mixture of 100 parts by weight of carbon black (except for platinum) and 15 parts by weight of vapor grown carbon fiber (VGCF) in a solid weight ratio was used. These electrode pastes were sequentially sprayed on the surface of electrolyte membrane 1 to form the anode electrode catalyst layer consisting of two layer parts, and the MEA of Example 2 was thereby prepared.

Comparative Example 2

Except for not adding VGCF, the MEA of Comparative Example 2 was prepared in a similar manner as Comparative Example 1.

Figure 5:
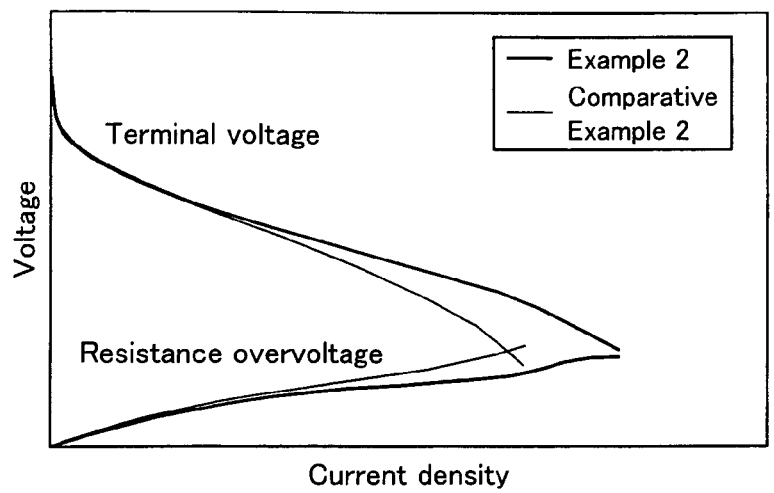
FIG. 5 is a graph showing power generation efficiency of the electrode assembly of Examples and Comparative Examples.

The efficiency of MEAs of Example 2 and Comparative Example 2 were compared. The results are shown in FIG. 5. FIG. 4 clearly shows that terminal voltage is improved by adding VGCF to the electrode catalyst layer, and in particular, resistance overvoltage can be greatly reduced.

What is claimed is:

1. A polymer electrolyte fuel cell comprising:
   a cathode diffusion layer,
   a cathode electrode catalyst layer,
   a polymer electrolyte membrane,
   an anode electrode catalyst layer,
   an anode diffusion layer, and
   carbon whiskers positioned in a portion of the cathode electrode catalyst layer on the side of the cathode diffusion layer and positioned in a portion of the anode electrode catalyst layer on the side of the anode diffusion layer,
   wherein electron conductivity of the cathode electrode catalyst layer at a portion on the side of the cathode diffusion layer is higher than at a portion on the side of the polymer electrolyte membrane and electron conductivity of cathode electrode catalyst layer at the portion on the side of the polymer electrolyte membrane is lower than at the portion on the side of the cathode diffusion layer, and
   wherein electron conductivity of the anode electrode catalyst layer at a portion on the side of the anode diffusion layer is higher than at a portion on the side of the polymer electrolyte membrane and electron conductivity of anode electrode catalyst layer at the portion on the side of the polymer electrolyte membrane is lower than at the portion on the side of the anode diffusion layer.

2. The polymer electrolyte fuel cell according to claim 1, wherein proton conductivity of the cathode electrode catalyst layer at a portion on the side of the polymer electrolyte membrane is higher than at a portion on the side of the cathode diffusion layer and proton conductivity of cathode electrode catalyst layer at the portion on the side of the cathode diffusion layer is lower than at the portion on the side of the polymer electrolyte membrane, and
   wherein proton conductivity of the anode electrode catalyst layer at a portion on the side of the polymer electrolyte membrane is higher than at a portion on the side of the anode diffusion layer and proton conductivity of anode electrode catalyst layer at the portion on the side of the anode diffusion layer is lower than at the portion on the side of the polymer electrolyte membrane.

3. The polymer electrolyte fuel cell according to claim 2,
   wherein the cathode electrode catalyst layer comprises two layer portions; the layer portion on the side of the polymer electrolyte membrane has lower electron conductivity and higher proton conductivity than the layer portion on the side of the cathode diffusion layer; and the layer portion on the side of the cathode diffusion layer has higher electron conductivity and lower proton conductivity than the layer portions on the side of the polymer electrolyte membrane, and
   wherein the anode electrode catalyst layer comprises two layer portions; the layer portion on the side of the polymer electrolyte membrane has lower electron conductivity and higher proton conductivity than the layer portion on the side of the anode diffusion layer; and the layer portion on the side of the anode diffusion layer has higher electron conductivity and lower proton conductivity than the layer portions on the side of the polymer electrolyte membrane.

4. The polymer electrolyte fuel cell according to claim 2,
   wherein the cathode electrode catalyst layer and the anode electrode catalyst layer each comprises at least three layer portions,
   wherein the layer portions nearest to the polymer electrolyte membrane have the lowest electron conductivity and the highest proton conductivity among the layer portions, the layer portions nearest to the diffusion layer have the highest electron conductivity and the lowest proton conductivity among the layer portions, and the at least three layer portions have electron conductivity and proton conductivity which change stepwise, and
   wherein the stepwise change is continuous increase or continuous decrease.

5. The polymer electrolyte fuel cell according to claim 2,
   wherein the cathode electrode catalyst layer and the anode electrode catalyst layer each comprises a single layer,
   wherein a portion of the cathode and anode electrode catalyst layer nearest to the polymer electrolyte membrane have the lowest electron conductivity and the highest proton conductivity, a portion of the cathode and anode electrode catalyst layer nearest to the diffusion layer have the highest electron conductivity and the lowest proton conductivity, and electron conductivity and proton conductivity are gradually changed between the portions nearest to the polymer electrolyte membrane and the portions nearest to the diffusion layers, and
   wherein the gradual change is a continuously increasing gradient or a continuously decreasing gradient.

6. A polymer electrolyte fuel cell comprising:
a cathode diffusion layer,
a cathode electrode catalyst layer,
a polymer electrolyte membrane,
an anode electrode catalyst layer,
an anode diffusion layer, and
carbon whiskers positioned in a portion of the cathode electrode catalyst layer on the side of the cathode diffusion layer and positioned in a portion of the anode electrode catalyst layer on the side of the anode diffusion layer,
whereby electron conductivity of the cathode electrode catalyst layer at the portion on the side of the cathode diffusion layer is higher than at a portion on the side of the polymer electrolyte membrane and electron conductivity of cathode electrode catalyst layer at the portion on the side of the polymer electrolyte membrane is lower than at the portion on the side of the cathode diffusion layer, and
whereby electron conductivity of the anode electrode catalyst layer at the portion on the side of the anode diffusion layer is higher than at a portion on the side of the polymer electrolyte membrane and electron conductivity of anode electrode catalyst layer at the portion on the side of the polymer electrolyte membrane is lower than at the portion on the side of the anode diffusion layer.

* * * * *

UNITED STATES PATENT AND TRADEMARK OFFICE
CERTIFICATE OF CORRECTION

PATENT NO.        : 7,601,454 B2                                        Page 1 of 1
APPLICATION NO.   : 11/074931
DATED             : October 13, 2009
INVENTOR(S)       : Takahashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1229 days.

Signed and Sealed this

Fourteenth Day of December, 2010

David J. Kappos
*Director of the United States Patent and Trademark Office*